(12) United States Patent
Lester et al.

(10) Patent No.: US 10,372,185 B2
(45) Date of Patent: Aug. 6, 2019

(54) ENHANCED POWER CONTROL OF DATA STORAGE ARRAYS

(71) Applicant: HGST Netherlands B.V., Amsterdam (NL)

(72) Inventors: Robert Michael Lester, Colorado Springs, CO (US); Todd Christopher McNally, Peyton, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/811,297

(22) Filed: Jul. 28, 2015

(65) Prior Publication Data

US 2017/0031409 A1 Feb. 2, 2017

(51) Int. Cl.
*G06F 1/30* (2006.01)
*G06F 3/06* (2006.01)

(52) U.S. Cl.
CPC .............. *G06F 1/30* (2013.01); *G06F 3/0617* (2013.01); *G06F 3/0634* (2013.01); *G06F 3/0653* (2013.01); *G06F 3/0659* (2013.01); *G06F 3/0683* (2013.01); *G06F 3/0689* (2013.01)

(58) Field of Classification Search
USPC ......................................................... 714/14
See application file for complete search history.

(56) References Cited

U.S. PATENT DOCUMENTS

| | | |
|---|---|---|
| 6,934,107 B2 | 8/2005 | Escobar et al. |
| 6,967,811 B1 | 11/2005 | Codilian et al. |
| 6,970,315 B2 | 11/2005 | Tanimoto |
| 7,130,939 B2 | 10/2006 | Sumiyoshi et al. |
| 7,164,579 B2 | 1/2007 | Muncaster et al. |
| 7,324,296 B1 | 1/2008 | DeRosa |
| 7,450,334 B1 | 11/2008 | Wang et al. |
| 7,602,581 B2 | 10/2009 | Heise et al. |
| 8,015,420 B2 * | 9/2011 | Cherian ................. G06F 1/3203 713/300 |
| 8,296,513 B1 | 10/2012 | Liu |
| 8,595,535 B1 * | 11/2013 | Tamilarasan ........ G06F 11/3034 700/297 |
| 8,650,369 B1 | 2/2014 | Corddry et al. |
| 8,751,836 B1 * | 6/2014 | Piszczek ............... G06F 1/3268 713/300 |

(Continued)

OTHER PUBLICATIONS

"Dell, Powervault, MD1200, & MD1220 Technical Guidebook." DELL. 2010.

(Continued)

*Primary Examiner* — Kamini B Patel (57) ABSTRACT

To provide enhanced operation of data storage devices and systems, various systems, apparatuses, methods, and software are provided herein. In a first example, a data storage system is presented. The data storage system includes data storage devices configured for storage and retrieval of data, power supply modules configured to provide power to at least the plurality of data storage devices, and a management controller configured to monitor power properties associated with the power supply modules to detect a degraded power condition. Responsive to the degraded power condition, the management controller is configured to establish adjustments to performance of the data storage devices to mitigate the degraded power condition.

19 Claims, 4 Drawing Sheets

(56) References Cited

U.S. PATENT DOCUMENTS

| | | | |
|---|---|---|---|
| 8,788,779 B1* | 7/2014 | Horn | G06F 3/0616 |
| | | | 711/103 |
| 8,797,675 B2 | 8/2014 | Birtzer et al. | |
| 2002/0109935 A1 | 8/2002 | Korbel et al. | |
| 2002/0159187 A1* | 10/2002 | Kagami | G11B 5/59622 |
| | | | 360/78.09 |
| 2003/0174433 A1 | 9/2003 | Espeseth et al. | |
| 2004/0264036 A1 | 12/2004 | Ding et al. | |
| 2005/0005063 A1 | 1/2005 | Liu et al. | |
| 2009/0138734 A1* | 5/2009 | Uchida | G06F 1/266 |
| | | | 713/310 |
| 2010/0153680 A1 | 6/2010 | Baum et al. | |
| 2011/0122691 A1 | 5/2011 | Sprouse | |
| 2012/0066451 A1* | 3/2012 | Fujihara | G06F 11/1076 |
| | | | 711/114 |
| 2013/0333871 A1 | 12/2013 | Pimlott | |
| 2016/0077961 A1* | 3/2016 | Erez | G06F 3/0625 |
| | | | 711/103 |
| 2016/0085290 A1* | 3/2016 | Skandakumaran | G06F 1/3268 |
| | | | 713/320 |

OTHER PUBLICATIONS

"SAS to SAS/SATA JBOD Subsystem User Manual." Proware. Revision 1.2. pp. 1-28.

* cited by examiner

ENHANCED POWER CONTROL OF DATA STORAGE ARRAYS

TECHNICAL FIELD

Aspects of the disclosure are related to the field of data storage and data storage device arrays in data storage systems.

TECHNICAL BACKGROUND

Computer and network systems such as data storage systems, server systems, cloud storage systems, personal computers, and workstations, typically include data storage devices for storing and retrieving data. These data storage devices can include hard disk drives (HDDs), solid state storage drives (SSDs), tape storage devices, optical storage drives, hybrid storage devices that include both rotating and solid state data storage elements, and other mass storage devices.

As computer systems and networks grow in numbers and capability, there is a need for ever increasing storage capacity. Data centers, cloud computing facilities, and other at-scale data processing systems have further increased the need for digital data storage systems capable of transferring and holding immense amounts of data. Data centers can house this large quantity of data storage devices in various rack-mounted and high-density storage configurations.

While densities and workloads for the data storage devices increase, individual data enclosures can experience failures to associated power supply equipment which can contribute to increased failure rates for redundant power supply equipment. Moreover, when a power supply in a particular data enclosure experiences failures, operation of the data enclosure might be halted. When redundant power supplies are employed, a first power supply failure can cascade to cause further power supply failures due to surge or spike loading on the remaining power supplies.

OVERVIEW

To provide enhanced operation of data storage devices and systems, various systems, apparatuses, methods, and software are provided herein. In a first example, a data storage system is presented. The data storage system includes data storage devices configured for storage and retrieval of data, power supply modules configured to provide power to at least the plurality of data storage devices, and a management controller configured to monitor power properties associated with the power supply modules to detect a degraded power condition. Responsive to the degraded power condition, the management controller is configured to establish adjustments to performance of the data storage devices to mitigate the degraded power condition.

In another example, a method of operating a data storage system is provided. The method includes storing and retrieving data in a plurality of data storage devices, providing power to at least the plurality of data storage devices using one or more power supply modules, and monitoring power properties associated with the one or more power supply modules to detect a degraded power condition. Responsive to the degraded power condition, the method includes establishing adjustments to performance of the plurality of data storage devices to mitigate the degraded power condition.

In another example, a data storage assembly is provided. The data storage assembly includes a plurality of data storage devices comprising media for storage and retrieval of data, an enclosure configured to enclose and structurally support the plurality of data storage devices, a plurality of power supplies configured to provide power to at least the plurality of data storage devices in the enclosure, and a control system configured to monitor operational characteristics of the power supplies using one or more power supply monitors. The control system is configured to adjust at least one of a plurality of operational factors of the plurality of data storage devices to maintain the power consumption of the data storage assembly below a threshold power level when at least one of the plurality of power supplies experiences a degraded operational condition.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Data storage devices, such as hard disk drives (HDDs), solid state drives (SSDs), and hybrid disk drives that have both rotating and solid state storage elements, can be included in various arrayed configurations, such as rack-mounted enclosures which house dozens of individual drives. Cooling or ventilation fans can be included with the enclosures to direct airflow over the various drives. Power supply equipment can also be included to provide power to the various storage devices, to convert input power from a utility or building infrastructure to a form usable by the storage devices, and to provide other functions, such as holdup features, power monitoring features, and the like. When a first power supply fails or experiences a degraded condition, remaining power supplies can compensate for the degraded or failing power supply by continuing to provide power to associated storage drives. However, this can lead to increased stress on the remaining power supplies and in some cases to "clamping" conditions where a rapid increase in load on a remaining power supply can cause that remaining power supply to become overloaded or even fail.

Drives which incorporate rotating media, such as rotating magnetic media of hard disk drives, among others, also include various electromechanical elements to position read/write heads over the spinning media. These electromechanical elements include armatures, motors, actuators, voice-coils, servos, or other elements which can have associated power dissipation characteristics. Typically, a storage device positions the associated read/write elements over a desired portion of the media as quickly as possible to reduce lag time for reading and writing of data. However, in spinning media, even if the read/write head is positioned to a proper circumferential location, namely a data track, the media might still need to make a portion of a full rotation to place a desired data block under the read/write head. This process of moving the read/write heads to a desired track position is typically referred to as a seek operation.

Just-in-time (JIT) seek techniques have been developed which take advantage of seek delays in positioning of data blocks on the spinning media under the read/write heads. Various tracking algorithms can identify a position of the spinning media relative to a current read/write head position and establish a time to move the read/write heads to a desired position so as to meet the desired data block at a desired time without extra rotational delays incurred after positioning of the read/write head. These JIT techniques typically use less peak power than merely positioning the read/write head as fast as the electromechanical elements allow. Additionally, JIT techniques can include various selectable levels of seek performance, such as 256 levels in some examples.

Figure 1:
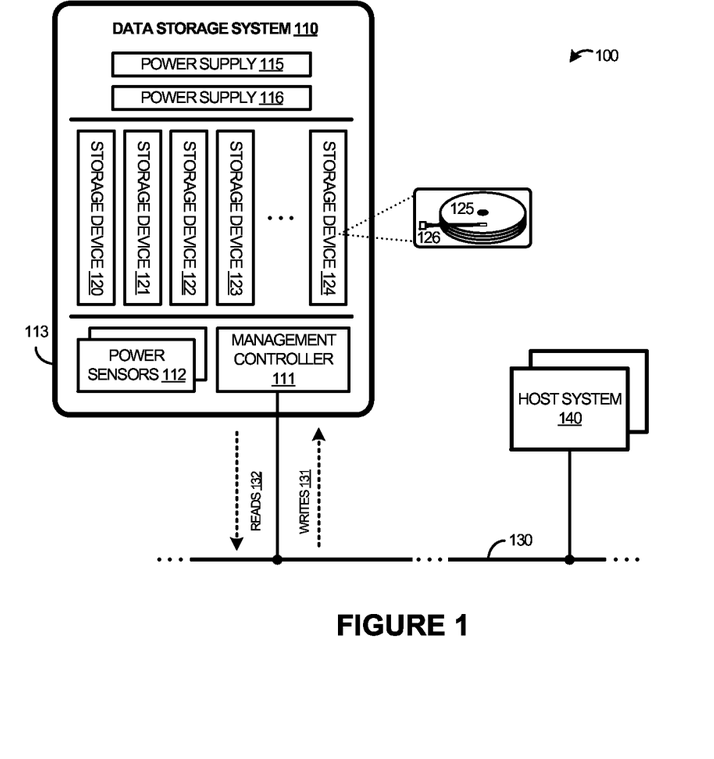
FIG. 1 is a system diagram illustrating a data system.

The examples discussed herein can employ adjustments to at least seek performance of data storage devices to affect power consumption of data storage arrays and associated data storage devices. As a first example of a data storage system, FIG. 1 is presented. FIG. 1 is a system diagram illustrating system 100. System 100 includes data storage system 110 and one or more host systems 140. Data storage system 110 and host system 140 communicate over storage link 130. Data storage system 110 can be included in an environment that includes one or more data storage arrays, such as a rackmount computing environment.

In FIG. 1, data storage system 110 comprises an assembly that includes management controller 111, power sensors 112, enclosure 113, a plurality of power supplies 115-116, and a plurality of data storage devices 120-124. Each of data storage devices 120-124 can include one or more rotating storage media, such as shown in the detailed view for data storage device 124 as including rotating media 125 and read/write heads/armature assembly 126. In some examples, ones of data storage devices 120-124 includes solid state storage media, and may omit rotating media. Management controller 111 is communicatively coupled to data storage devices 120-124 and power sensors 112. Although management controller 111 is shown as internal to data storage system 110 in this example, it should be understood that in other examples management controller 111 can be included in other elements external to data storage system 110.

In operation, data storage system 110 receives read or write transactions over storage link 130 issued by host system 140, such as write operations 131 and read operations 132. Responsive to read operations, individual data storage devices in data storage system 110 can retrieve data stored upon associated storage media for transfer to host system 140. Responsive to write operations, individual data storage devices in data storage system 110 stores data on the associated storage media. It should be understood that other components of data storage system 110 and data storage devices 120-124 are omitted for clarity in FIG. 1, such as transaction queues, chassis, fans, interconnect, read/write heads, media, armatures, preamps, transceivers, processors, amplifiers, motors, servos, enclosures, and other electrical and mechanical elements.

Figure 2:
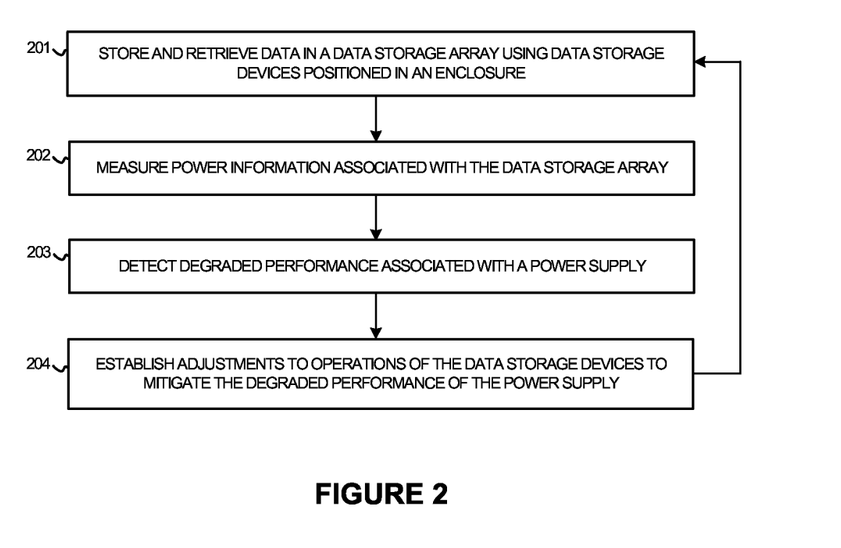
FIG. 2 is a flow diagram illustrating a method of operation of a data storage system.

To further illustrate the operation of data system 100, FIG. 2 is provided. FIG. 2 is a flow diagram illustrating a method of operating data storage system 110. The operations of FIG. 2 are referenced below parenthetically. In FIG. 2, data storage system 110 stores and retrieves (201) data in data storage system 110 using data storage devices 120-124 positioned in enclosure 113. Data storage system 110 receives read and write operations over storage link 130 and ones of data storage device 120-124 can handle these operations, such as by storing write data or retrieving read data. Read operations can include reads 132 received by management controller 111, and write operations can include writes 131 received by management controller 111. Other transactions or operations can be received for handling by management controller 111, such as metadata operations, maintenance operations, or administration operations, among others.

During operation of data storage system 110, management controller 111 measures (202) power information associated with data storage system 110. One or more power sensors 112 are included in data storage system 110 to measure power consumption, among other power-related metrics or characteristics, such as current draw or voltage levels. The power consumption can be related to power consumed by any of storage devices 120-124, management controller 111, or other elements, such as fans, displays, user interface elements, or other components that receive power from any of power supplies 115-116. These power sensors can monitor the various power information associated with each of power supplies 115-116 and transfer this power information to management controller 111, which monitors (202) the power information. The power information can indicate power information for input, output, and consumption in Watts (W), voltages in Volts (V), and current in Amps (A), among other units and measures. Operational status of power supplies 115-116 can also be monitored to identify when any of power supplies 115-116 fail or experience a degraded operational status.

Data storage system 110 detects (203) degraded performance associated with a power supply. This degraded performance can be associated with a single power supply of data storage system 110 or with more than one power supply. The degraded performance can include when a power supply, such as power supply 115 or 116 fails. The failure can include failure of components that comprise the power supply or of an input power source for that particular power supply. In many examples, a plurality of power supply modules are included in data storage system 110 and one (or more) of the power supply modules can experience a failure which can result in that power supply being no longer able to provide output power to storage devices 120-124. However, since more than one power supply module, such as power supplies 115-116, are included in a redundant manner, then the power supplies which remain functional can continue to provide power to the various components of data storage system 110.

In other examples, the degraded performance occurs when a power supply continues to function, but an input power source for that power supply is removed or reduced in voltage. Sensors 112 and management controller 111 can monitor an input power characteristic, such as by monitoring an input voltage level for each power supply, and can determine when a particular input voltage level falls below a threshold level. This threshold level can indicate a lower voltage level which results from brownout conditions or other faulty conditions on a line providing power to that particular power supply.

Data storage system 110 establishes (204) adjustments to at least operations of data storage devices 120-124 to mitigate the degraded performance of the power supplies. When a first power supply fails in data storage system 110, one or more remaining redundant power supplies can continue to provide power to the elements of data storage system 110. However, these remaining operating power supplies might experience an increase in workload due to having one less power supply available to provide a share of the power workload. For example, when two power supplies are included in data storage system 110, the power supplies can split workload for power conversion and distribution duties among themselves and each would provide one-half of the power consumption needs of data storage system 110, although other ratios and workload divisions are possible. However, when one of the two power supplies fails, then the remaining power supply must supply all of the power for data storage system 110. To prevent an increase in workload for the remaining power supply, or to mitigate overloading on the remaining power supply, data storage system 110 can make adjustments to the operations of at least data storage devices 120-124.

These adjustments can include altering a seek performance of data storage devices 120-124, such as when data storage devices 120-124 comprise rotating media with associated read/write head components. When adjustments or alteration to seek operations are made responsive to degraded power supply performance, these adjustments can be instructed by management system 111 to any of data storage devices 120-124. The seek operations of a data storage device can include associated delays from which a read/write head is moved from an initial position over a storage media to a desired track position. These seek operations might desire for the read/write heads to be moved as quickly as possible. However, this can lead to increased power dissipation in the various electromechanical elements which move or position the read/write heads. Seek operations of the data storage devices in data storage system 110 can be modified to reduce a peak speed of the various electromechanical elements which move or position the read/write heads. This reduction in peak speed can lead to less power dissipation by those elements, lower power dissipation of each storage device, and also in the aggregate by data storage system 110.

Various adjustments to seek properties of data storage devices 120-124 can be made. For example, a seek profile can be adjusted for one or more of data storage devices 120-124 which reduces a peak power dissipation over a range of seek operations. For example, shorter seek operations can have less of a reduction in tracking speed than longer seek operations, to provide for a net decrease in power dissipation. In other examples, all seek operations are reduced by a predetermined amount, such as a percentage of speed, time, velocity, acceleration, or power usage to position associated read/write heads.

In further examples, a just-in-time (JIT) seek operation can be established and adjusted for ones of data storage devices 120-124. These JIT seek operations can time the arrival of a read/write head to a desired position over a desired data track the storage media to coincide closely with a desired data block or data sector within that data track. JIT operations can have various levels of adjustment, such as 256 levels in some examples, or a subset thereof. Management controller 111 can make adjustments to the JIT levels or other seek properties based on power information measured by any of power sensors 112.

When non-rotating media are employed, such as solid state media, performance adjustments can be made, such as reducing a throughput of associated solid state storage components, throttling a write performance of the solid state media to limit power consumption for write operations, or halting write operations to flash media while caching pending write data in other solid state media, such as non-volatile memory or volatile memory. Further adjustments are discussed in the other examples below.

These adjustments can be made to reduce a power consumption of data storage system 110, such as to limit power consumption to below a power consumption threshold. For example, the remaining one or more power supplies can experience greater workloads when a first power supply fails and responsively power consumption for data storage system 110 can be reduced to limit the power consumption to within a predetermined nominal range for the remaining power supplies. In some examples, the power consumption can be reduced to a level commensurate with an amount of power capacity lost due to failure of the first power supply, such as to half of an original power consumption level when two power supplies are employed and a first one fails. The adjustments can remain in effect until a power supply is added or replaced to return a power supply capacity of data storage system 110 back to the original level before the failure.

Likewise, when a power supply does not fail, but an input voltage to a power supply drops below a threshold level, then these adjustments can also be made to mitigate a reduction in power commensurate with the voltage drop or to mitigate an increase in current draw from the source/input due to the voltage drop. If an input voltage to any of power supplies 115-116 falls by a first amount, such as ten percent (10%), then the corresponding power consumption can be reduced in data storage array 110 by that first amount, such as by 10%, to maintain a loading on the power supplies as constant during the input voltage drop. Other amounts of scaling of power consumption due to lower input power levels can be achieved.

Other adjustments include reducing or halting background media scans (BMS) or data integrity checks of data storage devices 120-124. In further examples, ones of data storage devices 120-124 can be powered down or have associated rotating media spun down to a slower rate or halted operation to reduce power consumption of data storage system 110. Combinations of these techniques can be employed, and these changes can be applied across only selected ones of data storage devices 120-124 as well as to the entire collection of data storage devices 120-124.

Returning to the elements of FIG. 1, data storage system 110 comprises a plurality of data storage devices 120-124. These data storage devices are coupled to management controller 111 by one or more storage links, which can comprise a serial ATA interface, Serial Attached Small Computer System (SAS) interface, Integrated Drive Electronics (IDE) interface, Non-Volatile Memory Express (NVMe) interface, ATA interface, Peripheral Component Interconnect Express (PCIe) interface, Universal Serial Bus (USB) interface, wireless interface, Direct Media Interface (DMI), Ethernet interface, networking interface, or other communication and data interface, including combinations, variations, and improvements thereof. Data storage system 110 can also comprise cache systems, chassis, enclosures, fans, interconnect, cabling, or other circuitry and equipment.

Management controller 111 includes processing circuitry, communication interfaces, and one or more non-transitory computer-readable storage devices. The processing circuitry can comprise one or more microprocessors and other circuitry that retrieves and executes firmware from memory for operating as discussed herein. The processing circuitry can be implemented within a single processing device but can also be distributed across multiple processing devices or sub-systems that cooperate in executing program instructions. Examples of the processing circuitry include general purpose central processing units, application specific processors, and logic devices, as well as any other type of processing device, combinations, or variations thereof. The communication interfaces can include one or more storage interfaces for communicating with host systems, networks, and the like. The communication systems can include transceivers, interface circuitry, connectors, buffers, microcontrollers, and other interface equipment.

Power sensors 112 each comprise one or more sensing elements for measuring power consumption, current draw, voltage levels, or other associated properties of data storage system 110, such as input voltages/currents for each of power supplies 115-116, or power consumptions for data storage devices 120-124 and other components associated with enclosure 113.

Power sensors 112 can comprise current sensing elements, voltage sensing elements, power consumption processing elements, or other power sensing elements. Current sensing elements can include current sense resistors, operational amplifiers, comparators, magnetic current sensing elements, Hall Effect sensing elements, or other current sensing elements. Voltage sensing elements can include voltage dividers, operational amplifiers, or other analog or digital voltage sensing elements. Power sensors 112 can also include various interfaces for communicating measured power information, such as to management controller 111. These interfaces can include transceivers, analog-to-digital conversion elements, amplifiers, filters, signal processors, among other elements. In some examples, power sensors 112 can each include microcontroller elements, programmable logic, or discrete logic to control the operations of power sensors 112. In examples where data storage devices 120-124 each include ones of power sensors 112, data storage devices can include equipment and circuitry to transfer power information over an associated storage or host interface to management controller 111.

Enclosure 113 comprises structural elements to house and structurally support the elements of data storage system 110. Enclosure 113 can include chassis elements, frames, fastening elements, rackmount features, ventilation features, among other elements. In many examples, enclosure 113 also includes fans or other cooling and ventilation elements for providing airflow to the elements of data storage system 110.

Data storage system 110 also includes one or more power supplies 115-116 to convert external input power sources or provide various forms of electrical energy to the elements of data storage system 110. Power supplies 115-116 each comprise power conversion elements, power electronics, transformers, voltage conversion circuitry, among other elements. In some examples, power supplies 115-116 each include voltage, current, or power monitoring circuitry and can provide this monitored information to management controller 111. Power supplies 115-116 can also include one or more ventilation fans to provide cooling and ventilation to power supplies 115-116 and to other components in enclosure 113. In operation, power supplies 115-116 each convert and condition line power provided by a facility or utility to voltage and current requirements of the elements of data storage system 110. This can include voltage step up circuitry, voltage step down circuitry, current or power limiting and monitoring circuitry, AC-to-DC conversion circuitry, DC-to-DC conversion circuitry, power factor correction circuitry, or electromagnetic interference mitigation circuitry, among other power conversion features and circuitry.

Each of data storage devices 120-124 includes one or more computer readable storage media accessible via one or more read/write heads and associated electromechanical elements. In FIG. 1, an example detailed view of data storage device 124 is shown to highlight rotating media 125 and read/write heads and armature assembly 126, and these elements can be included in each of data storage devices 120-124, although variations are possible among the data storage devices. Data storage devices 120-124 can also each include processing circuitry, communication interfaces, armatures, preamps, transceivers, processors, amplifiers, motors, servos, enclosures, and other electrical and mechanical elements. Data storage devices 120-124 can each comprise a hard disk drive, hybrid disk drive, solid state drive, or other computer readable storage device, including combinations thereof. Data storage devices 120-124 can each include further elements, such as those discussed for disk drives 320-323 in FIG. 3, although variations are possible. The computer readable storage media of data storage devices 120-124 can each include rotating magnetic storage media, but can additionally include other media, such as solid state drive elements, caches, or cache systems. These other media can include solid state storage media, optical storage media, non-rotating magnetic media, phase change magnetic media, spin-based storage media, or other storage media, including combinations, variations, and improvements thereof. In some examples, data storage devices 120-124 each comprise a hybrid hard drive employing solid state storage elements in addition to rotating magnetic storage media. Associated storage media can employ various magnetic storage schemes, such as random write techniques, shingled magnetic recording (SMR), or perpendicular magnetic recording (PMR), including combinations, variations, and improvements thereof.

Host system 140 can include processing elements, data transfer elements, and user interface elements. In some examples host system 140 is a central processing unit of a computing device or computing system. In other examples, host system 140 also includes memory elements, data storage and transfer elements, controller elements, logic elements, firmware, execution elements, and other processing system components. In yet other examples, host system 140 comprises a RAID controller processor or storage system central processor, such as a microprocessor, microcontroller, Field Programmable Gate Array (FPGA), or other processing and logic device, including combinations thereof. Host system 140 can include, or interface with, user interface elements which can allow a user of data system 100 to control the operations of data system 100 or to monitor the status or operations of data system 100. These user interface elements can include graphical or text displays, indicator lights, network interfaces, web interfaces, software interfaces, user input devices, or other user interface elements. Host system 140 can also include interface circuitry and elements for handling communications over bus 130, such as logic, processing portions, buffers, transceivers, and the like.

Bus 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one bus 130 is shown in FIG. 1, it should be understood that one or more discrete links can be employed between the elements of data system 100.

Figure 3:
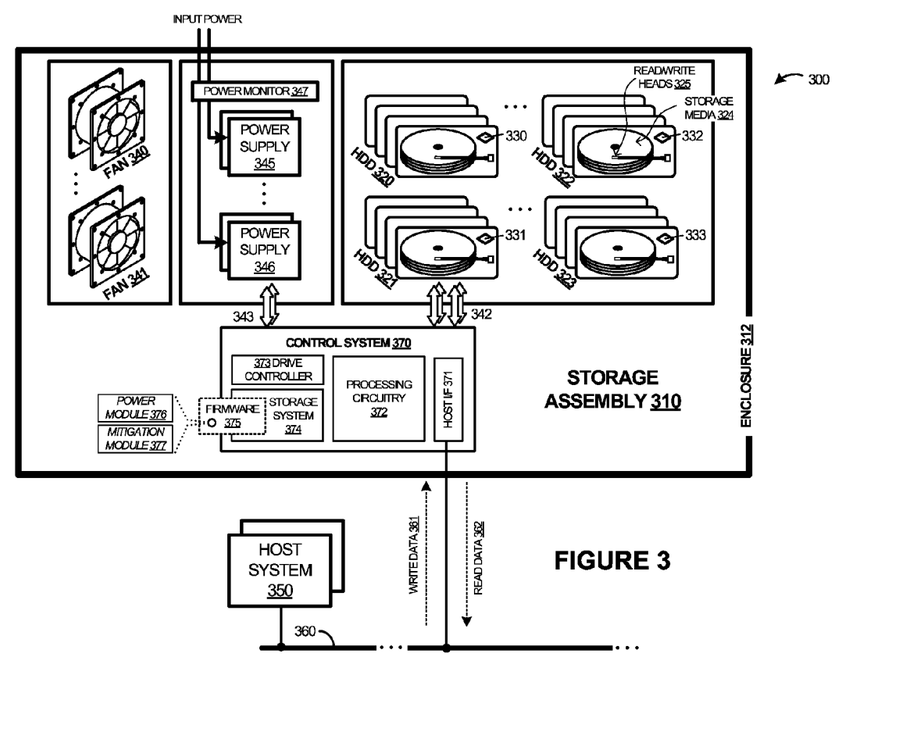
FIG. 3 is a system diagram illustrating a data system.

As a further example data storage system employing a data storage array, FIG. 3 is presented. FIG. 3 is a system diagram illustrating data storage system 300. Data storage system 300 includes storage assembly 310 and one or more host systems 350. Storage assembly 310 and host system 350 communicate over storage link 360. Various elements of storage assembly 310 can be included in data storage system 110 of FIG. 1, although variations are possible. Although one storage assembly 310 is shown in FIG. 3, it should be understood that more than one storage assembly could be included and linked to host system 350 or other host systems, such as in a data storage environment employing many data storage arrays.

Storage assembly 310 can comprise a storage assembly with associated enclosure and structural elements which is insertable into a rack that can hold other storage assemblies, such a rackmount server environment. The enclosure can include structural elements to mount the plurality of storage drives and can also include at least one external connector for communicatively coupling control system 370 or host interface 371 of storage assembly 310 over storage link 360.

Storage assembly 310 can comprise a redundant array of independent disks (RAID) array, or a JBOD device ("Just a Bunch Of Disks") device which include a plurality of independent disks which can be spanned and presented as one or more logical drives to host system 350. In some examples, storage assembly 310 comprises a virtual bunch of disks (VBOD) which adds one or more layers of abstraction between physical storage drives and external interfaces. A VBOD can employ various types of magnetic recording technologies and abstract front-end interactions from the particular recording technology. For example, shingled magnetic recording (SMR) hard disk drives typically have inefficiencies for random writes due to the shingled nature of adjacent tracks for data. In SMR examples, the VBOD abstracts the SMR drives and allows random writes and random reads while still having underlying SMR media which ultimately hold the associated data. Other recording techniques can be employed, such parallel magnetic recording (PMR), or heat-assisted magnetic recording (HAMR), including variations, improvements, and combinations thereof.

Storage link 360 can include one or more links, although a single link is shown in FIG. 3. Storage link 360 can comprise a storage or disk interface, such as Serial Attached ATA (SATA), Serial Attached SCSI (SAS), FibreChannel, Universal Serial Bus (USB), SCSI, InfiniBand, NVMe, Peripheral Component Interconnect Express (PCIe), Ethernet, Internet Protocol (IP), or other parallel or serial storage or peripheral interfaces, including variations and combinations thereof.

Host system 350 can include one or more computing and network systems, such as personal computers, servers, cloud storage systems, packet networks, management systems, or other computer and network systems, including combinations and variations thereof. In operation, host system 350 issues read and write commands or operations to storage assembly 310 over storage link 360, among other commands or operations which can include control instructions, metadata retrieval operations, configuration instructions, and the like. Likewise, storage assembly 310 can transfer read data over storage link 360, among other information such as graphical user interface information, status information, operational information, drive seek information, temperature information, power information, failure notifications, alerts, and the like.

Storage assembly 310 includes a plurality of hard disk drives (HDDs), namely HDD 320-323, although any number of HDDs can be included. Although FIG. 3 indicates hard disk drives for each of HDD 320-323, it should be understood that HDD 320-323 can each comprise hybrid disk drives which comprise rotating media and solid state storage components which work in tandem. In further examples, solid state drives (SSDs), optical storage drives, or other non-transitory computer-readable storage devices are employed. Each HDD 320-323 is coupled to control system 370 by one or more storage links, which in this example comprises Serial Attached SCSI (SAS) links, although other link types can be employed.

Each HDD 320-323 can comprise similar elements, and for exemplary purposes, a detailed view of HDD 320-323 is shown in FIG. 3 as including rotating storage media 324, read/write heads 325, and optionally power sensors 330-333, although variations are possible among HDD 320-323. HDD 320-323 can include further elements, such as armatures, preamps, transceivers, processors, amplifiers, motors, servos, cases, seals, enclosures, and other electrical and mechanical elements.

Storage assembly 310 also includes power supplies 345-346, power monitor module 347, control system 370, one or more ventilation fans 340-341, and storage enclosure 312. Control system 370 includes processing circuitry 372, drive controller 373, storage system 374, and host interface (I/F) 371. Furthermore, control system 370 includes firmware 375 which includes power module 376 and mitigation module 377 which, when executed by at least processing circuitry 372, operates as described below.

Power monitor module 347 comprises one or more sensing elements for measuring power consumption, current draw, voltage levels, or other associated power related properties of storage assembly 310, such as input voltages/currents for each of power supplies 345-346, or power consumption for HDDs 320-323 and other components associated with storage assembly 310. Power monitor module 347 can comprise current sensing elements, voltage sensing elements, power consumption processing elements, or other power sensing elements. Current sensing elements can include current sense resistors, operational amplifiers, comparators, magnetic current sensing elements, Hall Effect sensing elements, or other current sensing elements. Voltage sensing elements can include voltage dividers, operational amplifiers, or other analog or digital voltage sensing elements. Power monitor module 347 can also include various interfaces for communicating measured power information, such as to control system 370 over management links 343. These interfaces can include transceivers, analog-to-digital conversion elements, amplifiers, filters, signal processors, among other elements. In some examples, power monitor module 347 can each include microcontroller elements to control the operations of power monitor module 347.

In FIG. 3, each HDD also optionally includes an associated power monitoring elements 330-333, which can comprise similar elements as power monitor module 347. These power monitors can be included among the electronic or mechanical elements of each HDD, and can measure power consumption associated with the HDD. Each HDD can also include equipment and circuitry to transfer power information determined by the associated power monitoring elements 330-333 over an associated storage interface to control system 370.

Storage enclosure 312 comprises structural elements to house and structurally support the elements of storage assembly 310. Enclosure 312 can include chassis elements, frames, fastening elements, rackmount features, ventilation features, among other elements. In many examples, enclosure 312 also includes fans 340-341 or other cooling and ventilation elements for providing airflow to the elements of storage assembly 310. Enclosure 312 can also include power supply elements to convert external power sources or provide various forms of electrical power to the elements of storage assembly 310. Fans 340-341 can comprise any fan type, such as axial-flow, centrifugal and cross-flow, or other fan types, including associated louvers, fins, or other directional elements, including combinations and variations thereof.

Control system 370 handles storage operations for storage assembly 310, such as receiving storage operations from host systems over storage link 360 in host interface 371. Write data 331 can be received in one or more write operations, and read data 332 can be provided to hosts responsive to one or more read operations. An interface can be provided to a host system, such as a single (or redundant) Ethernet interface, SATA interface, SAS interface, Fibre-Channel interface, USB interface, SCSI interface, Infini-Band interface, NVMe interface, PCIe interface, or IP interface, which allows for the host system to access the storage capacity of HDD assembly. Control system 370 can establish any number of logical volumes or logical storage units across the various HDDs in storage assembly 310, which can comprise spanning, redundant arrays, striping, or other data storage techniques.

Host interface 371 includes one or more storage interfaces for communicating with host systems, networks, and the like over at least link 360. Host interface 371 can comprise transceivers, interface circuitry, connectors, buffers, microcontrollers, and other interface equipment. Host interface 371 can also include one or more I/O queues which receive storage operations over link 360 and buffers these storage operations for handling by processing circuitry 372.

Control system 370 also includes processing circuitry 372, drive controller 373, and storage system 374. Processing circuitry 372 can comprise one or more microprocessors and other circuitry that retrieves and executes firmware 375 from storage system 374. Processing circuitry 372 can be implemented within a single processing device but can also be distributed across multiple processing devices or subsystems that cooperate in executing program instructions. Examples of processing circuitry 372 include general purpose central processing units, application specific processors, and logic devices, as well as any other type of processing device, combinations, or variations thereof. In some examples, processing circuitry 372 includes a system-on-a-chip device or microprocessor device, such as an Intel Atom processor, MIPS microprocessor, and the like.

Drive controller 373 can include one or more drive control circuits and processors which can control various data redundancy handling among the various HDDs of storage assembly 310. Drive controller 373 also includes HDD interfaces, such as SAS interfaces to couple to the various HDDs in storage assembly 310. In some examples, drive controller 373 and processing circuitry 372 communicate over a peripheral component interconnect express (PCIe) interface or other communication interfaces. In some examples, drive controller 373 comprises a RAID controller, RAID processor, or other RAID circuitry. In other examples, drive controller 373 handles management of a particular recording technology, such as SMR or HAMR techniques.

As mentioned herein, elements and functions of drive controller 373 can be integrated with processing circuitry 313.

Storage system 374 can comprise any non-transitory computer readable storage media readable by processing circuitry 372 or drive controller 373 and capable of storing firmware 375. Storage system 374 can include volatile and nonvolatile, removable and non-removable media implemented in any method or technology for storage of information, such as computer readable instructions, data structures, program modules, or other data. In addition to storage media, in some implementations storage system 374 can also include communication media over which firmware 375 can be communicated. Storage system 374 can be implemented as a single storage device but can also be implemented across multiple storage devices or sub-systems co-located or distributed relative to each other. Storage system 374 can comprise additional elements, such as a controller, capable of communicating with processing circuitry 372. Examples of storage media of storage system 374 include random access memory, read only memory, magnetic disks, optical disks, flash memory, SSDs, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Firmware 375, power module 376, and mitigation module 377 can be implemented in program instructions and among other functions can, when executed by control system 370 in general or processing circuitry 372 in particular, direct control system 370 or processing circuitry 372 to operate as described herein. Firmware 375 can include additional processes, programs, or components, such as operating system software, database software, or application software. Firmware 375, power module 376, and mitigation module 377 can also comprise software or some other form of machine-readable processing instructions executable by processing circuitry 372.

In at least one implementation, the program instructions can include first program instructions that direct control system 370 to handle read and write operations among the data storage devices, measure and monitor power consumption information or power supply operation (power module 376), take action to alter power consumption in storage assembly 310 (mitigation module 377), such as changing throughputs, altering seek profiles and properties, modifying data integrity check processes, or spinning down HDDs, among other operations.

In general, firmware 375 can, when loaded into processing circuitry 372 and executed, transform processing circuitry 372 overall from a general-purpose computing system into a special-purpose computing system customized to operate as described herein. Encoding firmware 375 on storage system 374 can transform the physical structure of storage system 374. The specific transformation of the physical structure can depend on various factors in different implementations of this description. Examples of such factors can include, but are not limited to the technology used to implement the storage media of storage system 374 and whether the computer-storage media are characterized as primary or secondary storage. For example, if the computer-storage media are implemented as semiconductor-based memory, firmware 375 can transform the physical state of the semiconductor memory when the program is encoded therein. For example, firmware 375 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 4:
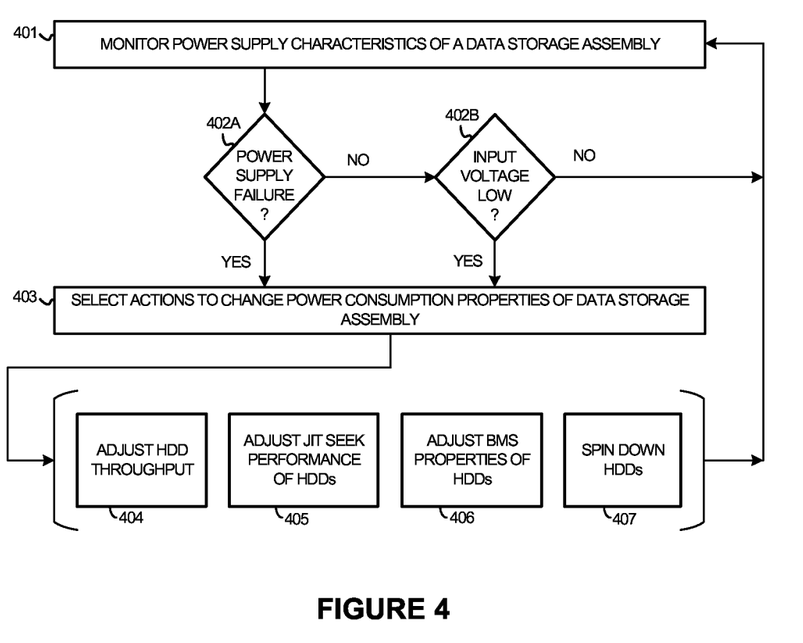
FIG. 4 is a flow diagram illustrating a method of operation of a data storage system.

To further illustrate the operation of system 300 and storage assembly 310, FIG. 4 is presented. FIG. 4 is a flow diagram illustrating a method of operation of storage assembly 310. The operations of FIG. 4 are referenced below parenthetically. The various operations described herein for FIG. 4 can be performed by any combination of elements in storage assembly 310, such as processing circuitry 372 or drive controller 373 of control system 370, power monitor 347, power supplies 345-346, or by elements of HDDs 320-323.

In FIG. 4, storage assembly 310 receives read and write operations over host interface 371 and link 360. These read and write operations can be issued by host system 350, or other external systems. In write operations, write data is associated with one or more write operations which are received over link 360 from host system 350, such as write data 361 in FIG. 3. Write data can comprise one or more data blocks for storage by storage assembly 310 which is directed for storage at a designated storage address or storage location among the HDDs of storage assembly 310. Storage assembly 310 stores the write data for later retrieval, such as read data 362 for delivery to host system 350 over link 360. A particular HDD or set of HDDs can be designated to handle data for a particular logical storage unit (LUN) or storage partition. Read or write operations can be directed to any of the logical partitions, and indicate a storage address, logical unit, partition, or other indication that designates logical blocks in storage assembly 310 to which read or write operations are directed.

During operation of storage assembly 310, such as during servicing of read operations or write operations, various power sensors monitor (401) power supply characteristics for storage assembly 310. In FIG. 3, power monitor 347 as well as optional distributed power monitors 330-333 are employed to measure power information for elements of storage assembly 310, such as power consumption, voltage levels, or current draws related to power supplies 345-346, HDDs 320-323, control system 370, or fans 340-341. Likewise, each of HDD 320-323 can optionally include power sensors, such as those indicated by power sensors 330-333. These power sensors 330-333 can measure power consumption or other related information for an associated one of HDD 320-323.

Storage assembly 310 identifies one or more degraded conditions of power supplies 345-346. In some examples, power monitor module 347 monitors for the one or more degraded conditions and reports these conditions to control system 370. In other examples, control system 370 monitors for the one or more degraded conditions. In yet other examples, HDD 320-323 monitors for the one or more degraded conditions using power sensors 330-333 and report these conditions to control system 370. Combinations of monitoring using the various power information monitoring elements of storage assembly 310 can be employed.

These degraded power conditions can include failure of one or more of the power supplies of storage assembly 310, as indicated by operation 402A, or low input voltage to one or more of the power supplies, as indicated by operation 402B. Other degraded power conditions can include partial failure of a power supply, temperature within enclosure 312 exceeding a temperature threshold for power supply equipment, identification of short circuits, or failed or degraded power conversion or filtering circuitry, among other degraded power conditions.

Power supply failure can be detected by power monitor 347 or control system 370. An output voltage or current can be monitored by power monitor 347 or control system 370 to detect when those output voltages or currents fall to a zero level or fall below a threshold level. Input current draw can be monitored for each power supply to detect failure of that power supply when current ceases to be drawn or when current falls below a threshold level. These various monitored conditions can indicate operational failure of a power supply.

When a power supply fails, or ceases to produce power output, a remaining power supply of storage assembly 310 can continue to provide power for components of storage assembly 310 in a redundant manner. More than one redundant power supply can be included in storage assembly 310, and all power supplies of storage assembly 310 can split power handling in parallel among each other so that a failure of one power supply does not interrupt operation of HDDs 320-323. Thus, when a first power supply fails in storage assembly 310, one or more remaining redundant power supplies can continue to provide power to the elements of storage assembly 310. However, these remaining operating power supplies might experience an increase in workload due to having one less power supply available to provide an associated share of the power workload. This can lead to increased stress on the remaining power supplies and in some cases to "clamping" conditions where a rapid increase in load on a remaining power supply can cause that remaining power supply to become overloaded or even fail prematurely.

For example, when three power supplies are included in storage assembly 310, the power supplies can split workload for power conversion and distribution duties among themselves and each would provide one-third of the power consumption needs of storage assembly 310, although other ratios and workload divisions are possible. However, when one of the three power supplies fails, then the remaining power supplies must supply all of the power for storage assembly 310. This increase in loading for the remaining power supplies may cause increased failure rates for those power supplies, or in extreme cases to clamping conditions which cause the remaining power supplies to halt operation or have output power quickly reduced in capacity. To prevent an increase in workload for the remaining power supplies, or to mitigate overloading on the remaining power supplies, control system 370 can make adjustments to the operations of storage assembly 310 to control a power consumption of storage assembly 310

In addition to, or alternatively, external input levels can be monitored to determine a degraded operation of a power supply. Input voltage can be monitored to identify when input voltage falls outside of a desired voltage range. When a source input voltage falls, more current must typically be drawn from the external input to produce the same power output. This extra current draw may increase a heat generated by a power supply to increase the power supply or associated components to beyond a desired temperature. Likewise, when input voltage rises, less current is drawn but voltage spike or surge protection elements may dissipate increased power and become too hot or destructively fail, effectively turning off the associated power supply. In either voltage high or low conditions, operation of the power supplies can be degraded due to the examples listed above and also due to the power supplies operating in less than ideal ranges for various electrical and magnetic components selected for power conversion circuits and power protection circuits.

Advantageously, the enhanced operation described herein provides for control system 370 to dynamically adjust power consumption of storage assembly 310 and compensate for degraded performance of one or more of the power supplies of storage assembly 310. Various target power consumption thresholds can be established for use during degraded operation. For example, when a power supply fails, a power consumption target or threshold can be established to reduce the power consumption of storage assembly 310 to a predetermined nominal power output level of functioning ones of the power supply modules. In other examples, when a power supply fails, then the power consumption of storage assembly 310 can be reduced by an amount that the failed power supply was previously providing. During degraded input voltage conditions, power consumption of storage assembly 310 can be lowered to maintain a current draw of the power supplies to within a current range to prevent overloading of circuitry of the power supplies.

Once a degraded power condition is detected in storage assembly 310, such as by control system 370 or power monitor 347, control system 370 can make operational adjustments to components in storage assembly 310, such as HDDs 320-323 to reduce the power consumption in storage assembly 310. Control system 370 selects (403) one or more actions for HDDs 320-323 to change power consumption properties of storage assembly 310. Control system 370 can select actions from among increasing HDD throughput (404) for HDDs 320-323, adjusting JIT seek performance of HDDs 320-323 (405), adjusting BMS data integrity checking properties of HDDs 320-323 (406), or spinning down of one or more HDDs (407), among other actions. These actions can be taken individually or in combination for selected HDDs or for all of the HDDs of storage assembly 310.

In a first example adjustment to operations of storage system 310, control system 370 adjusts performance of HDDs 320-323 (404), such as by adjusting a throughput for HDDs 320-323. This throughput target can set a maximum throughput or performance on operations of HDDs 320-323 to cap power consumption by each of HDDs 320-323. Throughput can be controlled by establishing a rate at which read operations and write operations are serviced by HDDs 320-323, such as a target or maximum read or write storage operations per second. Throttling of throughput can be handled in control system 370, such as by a rate at which operations are managed in processing circuitry 372, drive controller 373, or host interface 371. HDDs 320-323 can also be instructed by control system 370 to conform to a target throughput. In examples where other data storage drives are employed, such as solid state drives or also in hybrid drives which include solid state memory elements, read/write throughput can also be controlled or throttled to adjust power consumption of the data drives.

JIT seek performance can be adjusted (405) by control system 370 to reduce power usage by individual ones of the HDDs of storage assembly 310. Speed of seek operations can reduced, and a range of speeds can be established over a range of seek distances to establish JIT seek profiles for each HDD. These JIT seek profiles can be adjusted to reduce power usage by HDD 320-323 during seek operations of the associated HDDs. Lower JIT seek levels use less power in a HDD by having a slower seek performance, while higher JIT seek levels use more power in a HDD by having a faster seek performance.

As mentioned above, many discrete JIT seek performance levels can be employed, and JIT seek profiles can be selected from among the various discrete JIT seek performance levels according to a desired power consumption for storage assembly 310. More aggressive power reductions using reduced seek performance can be established when lower power consumption is desired. Control system 370 can select among different JIT seek performance levels to further reduce power usage by HDDs during seek operations. For example, ten different JIT levels can be selected among based on power consumption within a power consumption range, with lower target power consumptions correlated to slower seek performances and higher target power consumptions correlated to faster seek performance.

To adjust the JIT levels or JIT seek performance of HDD 320-323, control system 370 can first determine a desired JIT seek performance level and responsively transfer instructions over associated storage interfaces to selected ones of HDD 320-323. HDD 320-323 can receive these instructions and implement the instructions to operate according to the received JIT seek performance level or JIT seek performance profile indicated by control system 370.

In addition to adjusting JIT seek performance of HDD 320-323, control system 370 can also alter the operation of various background operations of HDD 320-323, such as background data integrity checks (406). These background data integrity checks, also referred to as Background Media Scan (BMS) operations, are data verification operations performed periodically by HDDs to verify data that has already been written to storage media of the HDDs. These BMS operations ensure that data that resides on the storage media has sufficient data integrity to be read at a later time when a read operation is received. The BMS operations can occur periodically and over the various storage regions of the storage media. Typically, the associated HDD handles BMS operations independent of any external control system. However, BMS operations can lead to more power dissipation over time by a HDD, and contribute to increased power consumption of individual HDDs and within enclosure 312. In this example, control system 370 can disable BMS operations for one or more of HDD 320-323. Control system 370 can transfer instructions over a storage interface of an associated HDD to instruct that HDD to disable or enable the BMS operations for that HDD.

Adjusting throughput, JIT seek performance, BMS operations, or other properties of HDD 320-323 or data assembly 310 can lead to lower power consumption within enclosure 312, and thus better operating conditions for power supplies when storage assembly 310 experiences degraded power conditions due to failed power supplies or low input voltages. However, power consumption conditions might exist which do not respond well to these adjustments and actions, such as during extremely degraded power operation. In these cases, further actions can be taken by control system 370.

One or more of HDD 320-323 can be powered down. Alternatively, one or more of HDD 320-323 can have associated storage media halted, such as by halting a rotation or spin of rotating storage media, referred to as being spun down (407). This can further reduce power consumption of the associated HDD at the expense of preventing data access to the associated storage media. However, in certain degraded power operation events, equipment failure may be risked if power consumption rises above certain levels, and a powered down or spun down mode of operation is desired to preserve the data or to prevent power supply components from further degrading. This spun-down mode of operation might be entered responsive to the other power reduction measures not reducing power consumption to below desired threshold levels. In further examples, airflow provided by one or more of fans 340-341 can be adjusted to reduce a power consumption of fans 340-341. For example, a current fan speed can be monitored along with the current power consumption of storage assembly 310, and if a fan is not yet at a minimum power consumption, then the fan or fans can be adjusted to decrease an airflow rate by decreasing a speed of rotation of one or more of fans 340-341.

The various actions taken by control system 370 to control the power consumption of storage assembly 310 can be performed across all of HDD 320-323 or for individually selected ones of HDD 320-323. For example, if during degraded power conditions, the power consumption of storage assembly 310 rises above a threshold, then JIT seek profiles of all HDDs in enclosure 312 can be adjusted to reduce the power consumption of storage assembly 310. In other examples, control system 370 can identify a particular one or ones among HDD 320-323 that are experiencing elevated power consumption, and apply one or more of the actions to those particular HDDs to reduce the power consumption of storage assembly 310. In yet further examples, the power consumption of a particular HDD can indicate failure of that particular HDD, and control system 370 can isolate that HDD by powering that HDD down or indicating the failure to an operator.

Control system 370 continues to monitor power supply operation and power consumption to identify when a desired power conditions indicate degraded performance. When the degraded performance is relieved, such as when a power supply is replaced or repaired, or when an input voltage returns to within a desired range, control system 370 can return performance levels to previous levels or increase seek performance of various HDDs to previous performance. Thus, control system 370 can maintain power consumption of storage assembly 310 to within a predetermined range or to be below a threshold power consumption, with seek performance degraded using the above actions and adjustments to bring power consumption down when power supplies experience degraded performance, and seek performance enhanced to bring power consumption up when power supplies do not experience degraded performance. Advantageously, enhanced operation of a data storage assembly or data storage array can be established which allows for continued operation of data storage devices during times of failed power supplies or lowered input voltages.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage system, comprising:
    a plurality of data storage devices configured for storage and retrieval of data;
    a plurality of power supply modules configured to provide power to at least the plurality of data storage devices; and
    a management controller configured to:
        establish a just-in-time (JIT) seek performance for one or more active storage devices of the plurality of data storage devices;
        monitor power properties associated with a first power supply module of the plurality of power supply modules to detect a degraded power condition in the first power supply module,
            wherein the degraded power condition comprises a failure of the first power supply module to provide an amount of output power capacity;
        responsive to the degraded power condition:
            reduce a power consumption of the plurality of data storage devices by the amount of output power capacity during a period of time in which the first power supply module is not replaced by a replacement power supply module to mitigate an increase in a workload of one or more remaining power supply modules of the plurality of power supply modules during the period of time,
            wherein to reduce the power consumption of the plurality of data storage devices, the management controller dynamically adjusts the JIT seek performance for the one or more active storage devices.

2. The data storage system of claim 1, wherein to reduce the power consumption of the plurality of data storage devices, the management controller is configured to establish adjustments to at least seek operations of the plurality of data storage devices.

3. The data storage system of claim 1, wherein to reduce the power consumption of the plurality of data storage devices, the management controller is configured to throttle performance of the plurality of data storage devices.

4. The data storage system of claim 1, wherein to reduce the power consumption of the plurality of data storage devices, the management controller is configured to reduce seek performance of the plurality of data storage devices to reduce a power consumption of the data storage system to below a threshold power consumption.

5. The data storage system of claim 4, wherein the threshold power consumption comprises a power output level of at least a functioning one of the one or more remaining power supply modules.

6. The data storage system of claim 1, wherein:
    the degraded power condition further comprises an input voltage for the first power supply module falling below a threshold voltage level; and
    responsive to the input voltage for the first power supply module falling below the threshold voltage level, the management controller configured to alter seek performance of the plurality of data storage devices to reduce a power consumption of the data storage system to below a threshold power consumption.

7. The data storage system of claim 1, wherein the management controller is further configured to:
    in response to detecting the degraded power condition, adjust at least one additional factor of a plurality of operational factors of the data storage system to reduce a power consumption of the data storage system below a predetermined power consumption and prevent overloading of the one or more remaining power supply modules, the operational factors comprising at least the just-in-time (JIT) seek performance of the plurality of data storage devices and background media scan (BMS) integrity checking of the plurality of data storage devices; and in response to the adjustment to the at least one additional factor of the plurality of operational factors failing to reduce the power consumption to below the predetermined power consumption, instruct ones of the plurality of data storage devices to halt rotation of associated rotating media.

8. The data storage system of claim 1, wherein the management controller is further configured to:
detect the degraded power condition when input voltage to the first power supply module falls below a threshold voltage.

9. A method of operating a data storage system, the method comprising:
storing data in and retrieving data from a plurality of data storage devices;
providing power to at least the plurality of data storage devices using a plurality of power supplies;
establishing a just-in-time (JIT) seek performance for one or more active storage devices of the plurality of data storage devices;
monitoring power properties associated with the plurality of power supplies to detect a degraded power condition in a first power supply of the plurality of power supplies;
detecting the degraded power condition responsive to a failure of the first power supply to provide an amount of output power capacity; and
responsive to detecting the degraded power condition:
reducing a power consumption of the plurality of data storage devices by the amount of output power capacity of the first power supply prior to the failure to mitigate an increase in a workload of a remainder of the plurality of power supplies providing output power,
wherein reducing the power consumption includes at least dynamically adjusting the JIT seek performance for the one or more active storage devices of the plurality of data storage devices; and
maintaining the reducing of the power consumption of the plurality of data storage devices while the remainder of the plurality of power supplies provide output power without an additional power supply.

10. The method of claim 9, wherein reducing the power consumption includes at least establishing adjustments to seek operations of the plurality of data storage devices.

11. The method of claim 9, wherein reducing the power consumption includes at least at least throttling performance of the plurality of data storage devices.

12. The method of claim 9, wherein reducing the power consumption includes at least reducing seek performance of the plurality of data storage devices to reduce a power consumption of the data storage system to below a threshold power consumption.

13. The method of claim 12, wherein the threshold power consumption comprises a power output level of at least a functioning one of the plurality of power supplies.

14. The method of claim 9, wherein the degraded power condition further comprises an input voltage for the first power supply falling below a threshold voltage level, and further comprising:
responsive to the input voltage for the first power supply falling below the threshold voltage level, altering seek performance of the plurality of data storage devices to reduce a power consumption of the data storage system to below a threshold power consumption.

15. The method of claim 9, wherein reducing the power consumption includes adjusting at least one additional factor of a plurality of operational factors of the data storage system to reduce a power consumption of the data storage system below a predetermined power consumption and prevent overloading of remaining functional ones of the plurality of power supplies, the operational factors comprising at least the just-in-time (JIT) seek performance of the plurality of data storage devices and background media scan (BMS) integrity checking of the plurality of data storage devices; and
further comprising in response to the adjustments to the at least one additional factor of the plurality of operational factors failing to reduce the power consumption to below the predetermined power consumption, instructing ones of the plurality of data storage devices to halt rotation of associated rotating media.

16. The method of claim 9, further comprising:
detecting the degraded power condition responsive to input voltage to the first power supply falling below a threshold voltage.

17. A data storage assembly, comprising:
a plurality of rotating media data storage devices comprising media for storage and retrieval of data;
an enclosure configured to enclose and structurally support the plurality of rotating media data storage devices;
a plurality of power supplies configured to provide power to at least the plurality of rotating media data storage devices in the enclosure and comprising a first power supply and at least one additional power supply; and
a control system configured to:
establish a just-in-time (JIT) seek performance for one or more active storage devices of the plurality of data storage devices;
monitor operational characteristics of the first power supply using one or more power supply monitors, wherein the operational characteristics comprise an amount of output power capacity of the first power supply;
dynamically adjust at least one operational factor of a plurality of operational factors of the plurality of rotating media data storage devices to reduce a power consumption of the data storage assembly by the amount of output power capacity responsive to the first power supply experiencing a degraded operational condition comprising a failure to provide output power,
the at least one operational factor comprising the JIT seek performance for one or more active storage devices of the plurality of data storage devices; and
apply the adjusted at least one operational factor of the plurality of operational factors while the at least one additional power supply is a sole supply of output power.

18. The data storage assembly of claim 17, wherein the operational factors further comprise:
background media scan (BMS) integrity checking; and
rotation of the media of the plurality of rotating media data storage devices.

19. A method of reducing power consumption in response to a power supply failure, the method comprising:
step for storing data in and retrieving data from a plurality of data storage devices;
step for providing power from a plurality of power supply modules to the plurality of data storage devices;

step for detecting a failure of a first power supply module of the plurality of power supply modules to provide an amount of output power capacity; and responsive thereto:

step for reducing the power provided from a remainder of the plurality of power supply modules to the plurality of data storage devices by the amount of output power capacity failed to be provided by the first power supply module, wherein reducing the power includes at least adjusting a just-in-time (JIT) seek performance for one or more active storage devices of the plurality of data storage devices; and step for maintaining the reducing of the power provided from the remainder of the plurality of power supply modules while the remainder of the plurality of power supply modules provide output power without an additional power supply module.

* * * * *